United States Patent Office 2,965,627

Patented Dec. 20, 1960

2,965,627

ETHYLENE POLYMERIZATION PROCESS

Edmund Field and Omar O. Juveland, Chicago, and Herbert N. Friedlander, Homewood, Ill., and Frank L. Pilar, Cincinnati, Ohio, assignors to Standard Oil Company, Chicago, Ill., a corporation of Indiana No Drawing. Filed Mar. 28, 1956, Ser. No. 574,377

8 Claims. (Cl. 260—94.9)

This invention relates to novel polymerization catalysts and polymerization processes. The present invention provides processes suitable for the polymerization of compounds containing ethylenic unsaturation. It is especially suitable for the homo- or hetero-polymerization of hydrocarbons containing ethylenic unsaturation, particularly vinyl monoolefinic hydrocarbons. By the process of the present invention, unbranched, normally gaseous 1-alkenes can be polymerized to yield normally solid materials of high molecular weight, especially highly crystalline, resinous materials.

One object of our invention is to provide novel catalysts for the polymerization of organic compounds containing ethylenic unsaturation. More specific objects are to provide novel catalysts and processes for the polymerization of vinyl monoolefinic hydrocarbons. An additional object is to provide novel catalysts and processes for the polymerization of unbranched, normally gaseous 1-alkenes to produce relatively dense, resinous polymers. Yet another object is to provide new catalysts and processes for the polymerization of ethylene and/or other normally gaseous, unbranched 1-alkenes to produce solid polymers having high molecular weights and high degrees of crystallinity. A further object is to provide processes for the production of isotactic polymers from propylene, 1-butene, styrene and other monomers which offer the possibility of yielding isotactic polymers (note G. Natta, J. Polymer Sci. 25, 143–154 (April 1955)).

In accordance with our invention, organic compounds containing ethylenic unsaturation are polymerized readily under relatively mild reaction conditions with catalysts and catalyst promoters (hereinafter specified) to produce addition polymers, and in many cases, normally solid polymers. As catalyst promoters, we use small proportions, based on the weight of the catalyst, of organic carboxylic acids or esters thereof. Various salts which furnish the carboxylate ion can be substituted for the carboxylic acids. The promoters will hereinafter be referred to in a generic sense as carboxylic promoters or simply as promoters.

The catalysts employed in the polymerization process are prepared by mixing a salt of a transition metal selected from groups 4, 5, 6 or 8 of the Mendeleef periodic table with an alkali reagent selected from the group consisting of the alkali metals or their hydrides or hydrocarbon derivatives, or a mixture of two or more of the aforesaid alkali reagents. The admixture can be effected in an inert liquid reaction medium such as a saturated hydrocarbon. The admixture of the metal salt and alkali reagent appears to result in partial reduction of the positive valence state of the metal contained in said salt; more or less highly colored complexes form between the partially reduced salts and alkali reagents and/or other interaction products.

The molar ratios of polyvalent metal salt and alkali reagent can generally be varied broadly over the range of about 0.1 to about 10, more or less. It is preferred to use a molar excess of reducing agent (the alkali reagent) with respect to the polyvalent metal salt. In some cases the interaction proceeds at an appreciable or even high rate at room temperature; however, the temperature can be varied, depending on the specific reactants, between about −20° C. and about 300° C. The admixture can be effected in the presence or absence of the monomer or mixture of monomers which is to be polymerized. The partially reduced catalytic mixture can be stabilized by adding small proportions of a highly reactive olefin thereto, e.g. styrene, indene or the like.

We have found that the polymerization activity of the catalyst prepared by reaction of alkali reagents with the specified metal salts can be substantially increased (as evidenced by increased yields of polymer under otherwise comparable conditions) by the inclusion of a carboxylic promoter in the reaction zone. The proportion of carboxylic promoter which is employed can vary from about 0.01 to about 20% by weight, based on the weight of the alkali reagent which is employed in the preparation of the catalyst, but is usually within the range of about 1 to about 10 weight percent, preferably about 3 to about 6 weight percent. The promoter can be introduced in one or a plurality of charges, intermittently or continuously, in the step of catalyst preparation. Alternatively, the promoter can be introduced with the polymerization feed stock or as a separate charge to the reaction zone before or during polymerization.

Polymerization can be effected at selected temperatures which vary in accordance with the polymerization activity of the specific monomer(s), catalysts, promoter, desired reaction rate and the type of product which is desired. The selected polymerization temperatures generally fall within the range of about −40° C. to about 300° C., more often about 0° C. to about 250° C.; say about 25° C. to 175° C. for ethylene and similar monomers.

The preparation of catalysts and the polymerization are preferably effected in the absence of impurities which react with and consume the catalysts or the components of the catalytic mixture, such impurities being oxygen, carbon dioxide, water, etc.

Polymerization can be effected at atmospheric pressure or even lower pressures, but it may be advantageous to use superatmospheric pressures in order to obtain desirable monomer concentrations in contact with the catalyst. Thus, the polymerization can be conducted at pressures up to 10,000 p.s.i. or even higher pressures. Usually polymerization is effected at pressures between about 50 and about 2000 p.s.i.a.

The weight ratio of catalyst mixture to monomer can generally be varied in the range of about 0.01 to about 10% by weight, for example, about 0.1 to about 5 weight percent; even 100 weight percent catalyst can be used in flow operations.

Polymerization can be effected by contacting the unsaturated feed stock at the selected temperature and pressure with the mixture produced by the interaction of the catalyst components or with individual components of said mixture which exhibit catalytic activity.

Polymerization is preferably performed in the presence of various reaction media which remain liquid under the selected polymerization conditions of temperature and pressure. We prefer to employ relatively inert liquid reaction media such as saturated hydrocarbons, aromatic hydrocarbons, relatively unreactive alkenes, or cycloalkenes, perfluorocarbons, chloroaromatics or mixtures of suitable liquids.

Suitable agitation of the catalyst and monomer(s) is provided to secure effective contacting by means which are well known. Removal of the heat generated in polymerization can be effected by known means.

Through the present process, we can convert ethylene to wax-like homopolymers having an approximate specific viscosity ($\times 10^5$) between about 1000 and 10,000 and tough, resinous ethylene homopolymers having an approximate specific viscosity ($\times 10^5$) of 10,000 to more than 300,000. Propylene can be polymerized by the present process to normally solid materials which soften at temperatures well above room temperature, for example, at least about 75° C. or even much higher temperatures (in some cases exceeding the melting points of high molecular weight, solid polyethylenes).

The following examples are provided to illustrate the invention but not unduly to limit its broad scope.

The examples hereinafter tabulated were performed in glass reactors (100 cc. volume) employing 40 cc. of dry, distilled n-heptane as the liquid reaction medium. Polymerization operations were initiated at room temperature, after adding the catalyst and promoter components to the heptane, by introducing ethylene at 50 p.s.i.g. and allowing the reaction mixture to warm up due to the exothermic reaction. Ethylene was repressured into the reactors intermittently and reaction temperatures were maintained in the range of 25 to 35° C. In each instance the reaction period was 20 hours, except in run 1, in which it was 25 hours.

The melt viscosities were determined by the method of Dienes and Klemm, J. Appl. Phys. 17, 458–71 (1946). Polymer densities were determined at 24° C.

The reaction mixtures were worked up as follows. The reaction mixture was treated with dilute hydrochloric acid and then washed with water while agitating. The polymer was filtered and washed with water, then with acetone, dissolved in hot xylenes, filtered to remove inorganic materials and the filtrate was then cooled to room temperature and diluted with acetone to precipitate the solid polymer.

the catalysts of the present invention is for the polymerization of vinyl monoolefinic hydrocarbons, the term "vinyl" being defined as $CH_2=CH—$ (C.A. 39, 5966 (1945)). The vinyl monoolefinic hydrocarbons have the general formula

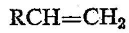

$$RCH=CH_2$$

wherein R is selected from the group consisting of hydrogen and saturated monovalent hydrocarbon radicals, i.e. hydrocarbon radicals containing no ethylenic unsaturation, viz. alkyl, cycloalkyl and aryl radicals, which generic classes also include the subgeneric classes of radicals such as arylalkyl, cycloalkylalkyl, alkylcycloalkyl, arylcycloalkyl, cycloalkylaryl and alkaryl.

Vinyl alkene monomers are important feed stocks for use in the present polymerization process because of their availability in large volume and reasonable cost. These feed stocks have the generic formula $$RCH=CH_2$$

wherein R is hydrogen or an alkyl radical. Specifically, suitable vinyl alkene feed stocks comprise ethylene, propylene, 1-butene, 1-pentene, 1-hexene and mixtures of one or more of these alkenes, or the like.

The process of the present invention can also be applied to polyolefinic hydrocarbons, especially conjugated alkadienes such as 1,3-butadiene, isoprene, piperylene, 4-methyl-1,3-pentadiene or to non-conjugated alkadienes such as 1,5-hexadiene or the like. These monomers can be polymerized alone or in mixtures with other vinyl monomers, especially vinyl monoolefinic hydrocarbons such as ethylene, propylene, styrene and the like, employing desired proportions of each monomer in a composite feed stock.

Vinyl arenes are suitable feed stocks, used alone or as comonomers with vinyl alkenes or conjugated alkadienes.

TABLE

*Ethylene polymerization*

| Run No. | Na, g. | Acid, Ester or Salt | g. | $TiCl_4$, g. | Yield of Polymer g. | Properties of Polymer | |
|---|---|---|---|---|---|---|---|
| | | | | | | d 24/4 | Melt Viscosity (145° C.) |
| 1 (Control) | 0.40 | None | | 0.43 | 0.31 | | |
| 2 | 0.437 | Sodium Stearate | 0.194 | 0.6 | 3.14 | 0.9589 | $2.6\times10^8$ |
| 3 | 0.437 | Lithium Stearate | 0.18 | 0.6 | 2.44 | 0.9663 | $3.6\times10^8$ |
| 4 | 0.437 | Lithium 12-hydroxy Stearate | 0.19 | 0.6 | 1.69 | 0.9623 | $7.7\times10^8$ |
| 5 | 0.437 | Al 2-ethyl hexanoate | 0.287 | 0.6 | 2.06 | 0.9542 | $1.1\times10^9$ |
| 6 | 0.437 | Dibutyl Tin Maleate | 0.2 | 0.6 | 2.59 | | |
| 7 (Control) | 0.65 | BuCl | 1.75 | 0.86 | 1.9 | | |
| 8 | 0.655 | BuCl<br>Ni Stearate | 1.75<br>0.1 | 0.86 | 9.17 | 0.9610 | $1.9\times10^9$ |
| 9 | 0.618 | BuCl<br>Na Benzoate | 2.48<br>0.13 | 1.2 | 2.79 | | $8.4\times10^7$ |
| 10 (Control) | 0.618 | None | | 1.2 | 1.0 | 0.9858 | $1.3\times10^9$ |
| 11 | 0.618 | Na Benzoate | 0.13 | 1.2 | 1.17 | | $1.2\times10^9$ |
| 12 | 0.618 | Ethyl Acetate | 0.08 | 1.2 | 1.47 | | $1.4\times10^9$ |
| 13 (Control) | 0.79 | None | | 1.09 | 1.1 | | |
| 14 | 0.79 | Methyl Laurate | 0.24 | 1.09 | 6.5 | 0.9430 | $1.5\times10^9$ |
| 15 | 0.79 | Ethyl Benzoate | 0.17 | 1.09 | 2.2 | 0.9938 | $3.9\times10^8$ |
| 16 | 0.79 | Trichloroacetic Acid | 0.19 | 1.09 | 2.67 | | |
| 17 | 0.98 | Stearic Acid | 0.4 | 1.35 | 3.55 | | |

The promotional effects of salts and esters of carboxylic acids on the yields of polyethylenes of high molecular weight will be readily apparent from the data in the table.

Our invention can be substantially extended from the specific illustrations thereof which have been supplied. Thus, the novel catalysts can be applied to the treatment of any organic compound containing an ethylenic linkage which is susceptible of addition polymerization, for example, the well known vinyl monomers, which need not be specified in detail herein (cf. C. E. Schildknecht, "Vinyl and Related Polymers," John Wiley & Sons, N.Y. (1952)). A particularly important application of Examples of vinyl arenes are styrene, nuclearly alkylated (especially methylated) styrenes, nuclearly halogenated styrenes and the like.

The invention can also be applied to such highly reactive olefins as indene and the like. The invention may be applied to 2-butene, 2-pentene, isobutylene, 2-methyl-2-butene, 5-methyl-1-hexene, tetrafluoroethylene, trifluorochloroethylene, t-butylethylene and the like, these olefins being employed as the sole feed stock or in minor proportions based upon some other monomer such as ethylene, propylene or the like.

It will be understood that the various monomers are not equivalents for the purposes of our invention and vastly different polymers can be secured by varying the feed stock. Our invention is especially useful and yields unexpected results when the monomer is a normally gaseous, unbranched 1-alkene, especially ethylene and/or propylene.

In the preparation of suitable polymerization catalysts, any of the alkali metals or alloys, or mixtures of alkali metals, or hydrides or hydrocarbon derivatives of alkali metals can be employed. Suitable alkali metal alloys include the amalgams, Na-K liquid alloys, lead-sodium alloys, e.g. $PbNa_4$, and the like. The alkali metals are lithium, sodium, potassium, rubidium and cesium; they form hybrides having the general formula MH, wherein M represents an alkali metal. The alkali metals form a variety of hydrocarbon derivatives having the general formula MR, wherein R represents a monovalent hydrocarbon radical which may be saturated or unsaturated, for example, an alkyl, aryl, aralkyl, alkaryl, cycloalkyl, conjugated cyclodienyl, and other hydrocarbon radicals. Suitable alkyl radicals include methyl, ethyl, propyl, isopropyl, butyl, isobutyl, amyl, octyl, dodecyl, hexadecyl, octadecyl, eicosyl, and the like, for example, as in ethyl sodium, methyl lithium, butyl lithium, methyl sodium, octyl potassium. Other suitable alkali metal compounds include isopropyl potassium, benzyl sodium, sodium acetylides, allyl sodium, etc. Organo-alkali compounds can be prepared by conventional techniques in situ, e.g., by the reaction of an alkali metal with a highly reactive metal alkyl such as a dialkyl mercury, a dialkyl zinc or the like; by the reaction of alkyl or allylic halides with alkali metal, etc.

Salts of the following metals can be used in the preparation of polymerization catalysts for the purposes of our invention: Ti, Zr, Hf, Th, V, Nb, Ta, U, Cr, Mo, W, Mn, Fe, Co, Ni, Ru, Rh, Pd, Os, Ir, Pt or mixtures of salts of said metals. We can employ the metal salts of various mineral acids, for example, the hydrohalogen acids; oxyhalides, e.g., titanyl chloride or vanadyl chloride and the like; salts of acids of phosphorus, sulfur, nitrogen, etc. We may also use the specified metal cyanides, cyanates, isocyanates, thiocyanates, isothiocyanates, azides, etc. The salts of carboxylic or sulfonic acids may also be used. Also, we may use metal derivatives, classified herein as salts, having the formula $M(OR)_n$, wherein M represents the polyvalent metal, R is an alkyl or aryl radical, and $n$ is the valence of M, for example, $Ti(OC_2H_5)_4$, $Ti(OC_3H_7)_4$, $Ti(OC_4H_9)_4$, tetra-2-ethylhexyl titanate, tetrastearyl titanate, tetraphenyl zirconate and the like, for example, the metal derivatives of the enol forms of acetylacetone, acetoacetic ester and the like.

In addition to or in lieu of the aforesaid metal salts, we may employ freshly precipitated oxides of hydroxides of said metals, which can be prepared by techniques which are well known in inorganic chemistry.

It will be understood that the various alkali reagents do not yield precisely the same results and the same is true of the various metal salts which may be employed to prepare catalysts for use in our invention. The broad variety of reagents which can be used to prepare active polymerization catalysts affords great flexibility in our invention.

The preparation of the catalyst can be effected in the presence of various solid materials, such as carbon, silica, alumina, bauxite, fluorided alumina, synthetic or natural aluminosilicates, magnesia, titania, zirconia, powdered aluminum fluoride, sodium fluoride, sodium chloride, cryolite or the like. The added solid material can comprise from about 10 to 2000 weight percent, based on the weight of materials which are allowed to react to form the polymerization catalysts.

In some cases, maximum catalytic activity can be attained by depositing or sorbing the polyvalent metal salt on the surface of a solid material, e.g. by stirring a solution or dispersion of said polyvalent metal salt with the finely-divided solid support, thereafter adding the alkali reagent to effect partial reduction of said salt and the formation of an extended, supported catalyst.

A wide variety of materials capable of furnishing a carboxylate ion under the reaction conditions are suitable for use as catalyst promoters in the present invention. A wide variety of organic carboxylic acids can be employed. Thus we may use organic compounds containing one or a plurality of carboxy groups. Among the carboxylic acids (or salts or esters) are the fatty acids (alkyl carboxylic acids), cycloalkyl carboxylic acids, aryl carboxylic acids, heterocyclic carboxylic acids, alkenyl carboxylic acids, cycloalkenyl carboxylic acids, acetylenic carboxylic acids, amino acids, particularly alpha-amino acids, betaines, N-alkyl and N,N-dialkyl carboxylic acids, or their mixtures, or the like.

Specific examples of alkyl monocarboxylic acids (fatty acids) which can be employed include such acids as acetic, propionic, n-butyric, n-valeric, pivalic, n-caproic, 3-methylpentanoic, heptanoic (enanthic), 2-methylhexanoic, 2-ethylhexanoic, nonanoic (pelargonic), decanoic (capric), dineopentylacetic, cyclopentylacetic, or their mixtures, or the like.

Examples of cycloalkylcarboxylic acids which can be used include cyclopentanecarboxylic acid, 2-methylcyclopentanecarboxylic acid, cyclohexanecarboxylic acid, or their mixtures, or the like.

Examples of aliphatic dicarboxylic acids which can be employed include malonic, succinic, tartaric, adipic, pimelic, azelaic, sebacic, 2-ethylsuberic and other isosebacic acids, etc.

Examples of heterocyclic carboxylic acids include the furoic acids, thiophenecarboxylic acids, nicotinic and isonicotinic acids and the like.

Examples of olefinic acids which can be employed include acrylic, crotonic, the pentenoic, hexenoic, octenoic, undecylenic, cinnamic and similar acids. Examples of acetylenic acids are propiolic, phenylpropiolic, 2-butynoic acids and the like.

Examples of aromatic carboxylic acids which can be used are benzoic acid, alkylbenzoic acids such as the toluic acids, cumic acids or the like, the phthalic acids, hemimellitic acid, trimellitic acid, trimesic acid, naphthoic acids and the like.

In lieu of the aforementioned and similar carboxylic acids, we can use various esters thereof having the generic formula $$R\overset{O}{\overset{\|}{C}}OR'$$

wherein R and R' are organic radicals, usually hydrocarbon radicals. Thus R' can be an alkyl, cycloalkyl, aryl group or their substitution derivatives. Examples of suitable alkyl groups include methyl, ethyl, propyl, isopropyl, amyl, isoamyl, t-amyl, hexyl, heptyl, octyl, nonyl, decyl, dodecyl, tetradecyl, hexadecyl, octadecyl, alkyl radicals isomeric therewith, or their mixtures, or the like. R' can also be a cycloalkyl radical such as cyclopentyl, methylcyclopentyl, cyclohexyl, methylcyclohexyl, ethylcyclohexyl or the like. R' can also be an aryl group such as phenyl, tolyl, xylyl or other alkylphenyl group, chlorophenyl, naphthyl or the like.

In lieu of the carboxylic acids we can employ a variety of salts thereof, particularly salts of ammonia, various amines; salts of light or heavy metals, e.g. the alkali metals, alkaline earth metals, aluminum, manganese, cobalt, nickel, etc. (Note H. G. Deming, "Fundamental Chemistry," John Wiley & Sons, Inc., New York, 1940, page 264.)

The polymeric products produced by the processes encompassed within the scope of our invention can be subjected to a variety of treatments designed to remove all or part of the catalytic materials therefrom. Thus the polymers can be washed with methanol, alcoholic alkalies, or the like in order to convert salts to the corresponding metal hydroxides.

The solid polymeric products can be dissolved in hot solvents, for example in unreactive hydrocarbons such as saturated or aromatic hydrocarbons, and the resultant solutions can be treated to separate polymer having relatively low content of material derived from the catalyst components. Thus hot hydrocarbon solutions of polymer can be subjected to the action of various hydrolytic agents to precipitate metal hydroxides which can then be separated from the remaining solution by centrifuging, decantation, filtration or other means. Alternatively, the hot hydrocarbon solution of polymer can be cooled or treated with precipitants or antisolvents such as acetone, methanol or the like to precipitate a small proportion, say up to about 5 weight percent of the solute polymer, which precipitate contains a very large proportion of the inorganic materials originally present in the polymer. The solvent can be recovered from the aforesaid operations and can be reused.

A desirable method for working up normally solid polymers of ethylene is to prepare a hot solution thereof in a normally liquid alkane, particularly in the $C_6$–$C_{12}$ range, having a solute concentration of the order of 2–3 weight percent, thereafter to filter said solution through a conventional filter medium, with or without a filter aid, to remove suspended particles derived from the polymerization catalyst, thereafter to contact the filtrate with an adsorbent filter aid in order to effect selective adsorption of colloidal polymer particles from the hot filtrate, thereafter to filter the hot filtrate and treat it to recover the purified ethylene polymer remaining in solution. This object can be achieved simply by cooling the filtrate to produce a precipitate of white polyethylene which is readily filterable by conventional methods. Treatments with filter aid, as described above, may be optional or desirable, depending upon the specific circumstances.

The polymers of the present invention can be used or treated as the polymers whose preparation is described in U.S. Patent 2,691,647 of Edmund Field and Morris Feller, granted October 12, 1954.

Having described our invention, we claim:

1. A process for the conversion of ethylene to a normally solid polymer which process comprises contacting a feedstock containing ethylene at a temperature between about 10° C. and about 175° C. with a polymerization catalyst prepared by the partial reduction of titanium tetrachloride with sodium in the presence of between about 0.01 and about 20% by weight, based on the weight of sodium, of an alkyl ester of a monocarboxylic acid having from 2 to about 12 carbon atoms in the molecule and separating a solid polymer thus produced.

2. The process of claim 1 wherein said ester is methyl laurate.

3. The process of claim 1 wherein said ester is ethyl benzoate.

4. The process of claim 1 wherein said ester is ethyl acetate.

5. A process for the conversion of ethylene to a normally solid polymer which process comprises contacting a feedstock containing ethylene at a temperature between about 10° C. and about 175° C. with a polymerization catalyst prepared by the partial reduction of titanium tetrachloride with sodium in the presence of between about 0.01 and about 20% by weight, based on the weight based on the weight of sodium, of an aliphatic monocarboxylic acid having from 2 to about 18 carbon atoms in the molecule and separating a solid polymer thus produced.

6. The process of claim 5 wherein said carboxylic acid is stearic acid.

7. The process of claim 5 wherein said carboxylic acid is trichloroacetic acid.

8. In a process for the preparation of a normally solid polymer which comprises contacting ethylene under polymerization conditions with a polymerization catalyst prepared by admixing an alkali metal with titanium tetrachloride, the improvement of effecting said contacting in the presence of a carboxylic compound selected from the group consisting of aliphatic monocarboxylic acids having from 2 to about 18 carbon atoms in the molecule and alkyl esters of monocarboxylic acids having from 2 to about 12 carbon atoms in the molecule, the proportion of said carboxylic compound being between about 0.01 and about 20% by weight based on the weight of alkali metal, and separating a solid polymer thus produced.

References Cited in the file of this patent

UNITED STATES PATENTS

| | | |
|---|---|---|
| 2,691,647 | Field et al. | Oct. 12, 1954 |
| 2,772,317 | Smith et al. | Nov. 27, 1956 |
| 2,824,090 | Edwards et al. | Feb. 18, 1958 |
| 2,827,445 | Bartolomeo et al. | Mar. 18, 1958 |
| 2,843,577 | Friedlander | July 15, 1958 |
| 2,845,412 | Heyson | July 29, 1958 |

FOREIGN PATENTS

| | | |
|---|---|---|
| 538,782 | Belgium | Dec. 6, 1955 |